Patented July 7, 1925.

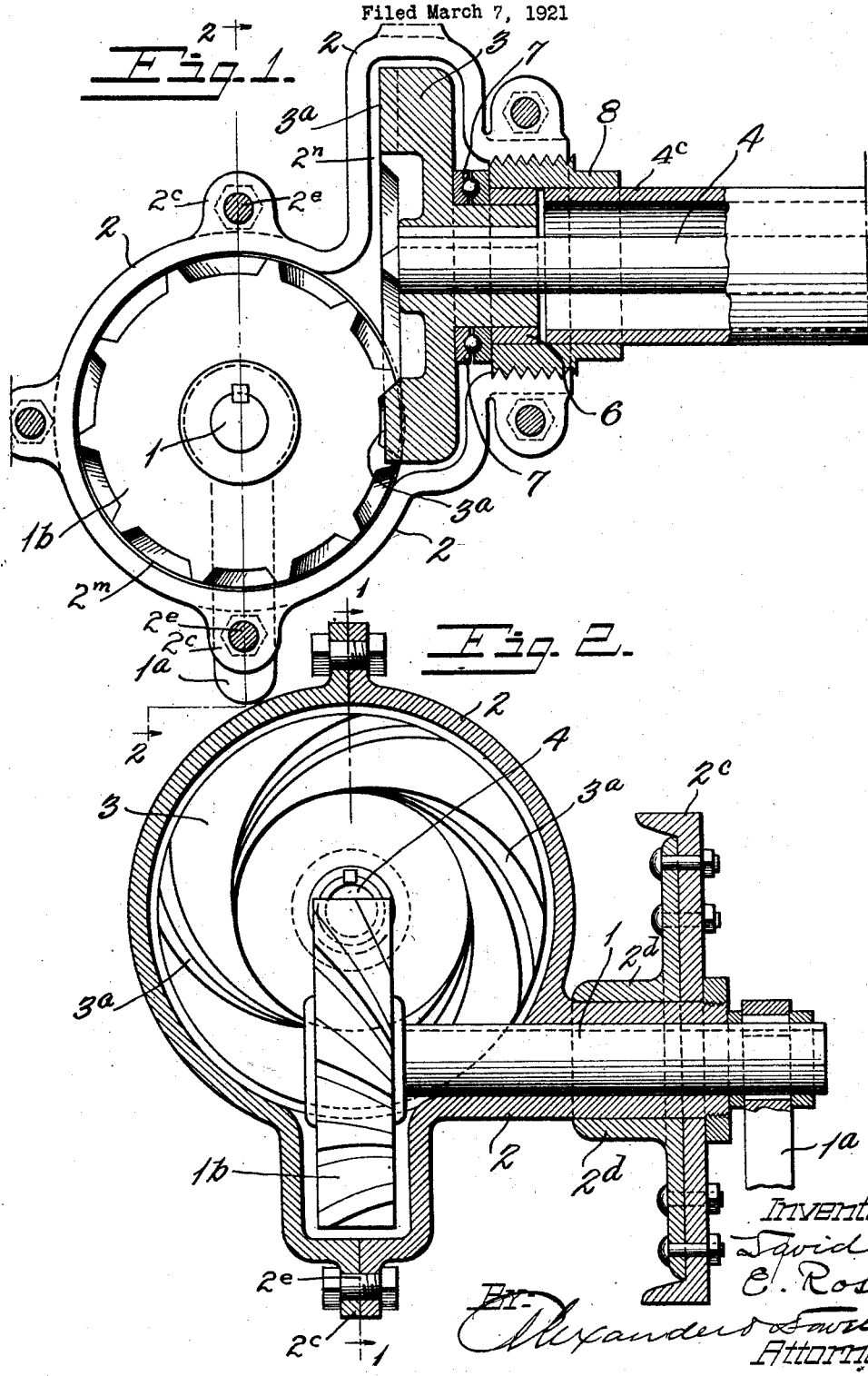

1,545,354

UNITED STATES PATENT OFFICE.

DAVID E. ROSS, OF LA FAYETTE, INDIANA, ASSIGNOR TO ROSS GEAR & TOOL COMPANY, OF LA FAYETTE, INDIANA, A CORPORATION OF INDIANA.

STEERING GEAR.

Application filed March 7, 1921. Serial No. 450,461.

*To all whom it may concern:*

Be it known that I, DAVID E. Ross, a citizen of the United States, residing at La Fayette, in the county of Tippecanoe and State of Indiana, have invented certain new and useful Improvements in Steering Gears; and I hereby declare that the following is a full, clear, and exact description thereof, reference being had to the accompanying drawings, which form part of this specification.

This invention is an improvement in steering gears for automobiles, boats, etc. Its object is to provide a simple, compact, strong steering gear in which motion is transmitted direct from the steering shaft to the rocker shaft in a powerful and efficient manner; which gear can be readily adjusted, is free from back lash, and will hold the steering wheels or rudder securely in any desired position.

In the accompanying drawings I have shown one practical embodiment of the invention and will explain the same with reference to the drawings and set forth in the claims the essentials of the invention and novel features of construction and combinations of parts for which protection is desired.

In said drawings:

Figure 1 is a sectional view of the steering gear on the line 1—1, Fig. 2, with part of the casing removed.

Fig. 2 is a transverse section, partly in elevation, on the line 2—2 Fig. 1.

The rocker shaft 1 is mounted in a casing 2 of any suitable construction, which casing may be fastened to the machine on which the gear is to be used by any suitable means; being shown as secured by a bracket $2^d$ attached to a beam $2^e$ of the chassis of a vehicle.

The steering arm $1^a$ may be of any desired construction and connected in any suitable manner to the outer end of the rocker shaft. Preferably the steering arm $1^a$ will be connected to the rocker shaft 1 by devices as shown in my Patent No. 1,136,557, dated April 20, 1915.

On the inner end of the rocker shaft is a spiral gear $1^b$ which meshes with spiral ribs $3^a$ on a disk 3 which is keyed, or otherwise rigidly fastened, to the steering shaft 4. The shaft 4 extends at right angles to the rocker shaft 1 as shown, but may be set at any desired inclination to the vertical when the shaft 1 is horizontal. The shaft 4 may be journaled in suitable bearings in the housing 2.

The housing 2 is shown as provided with a chamber $2^m$ for the reception of the gear $1^b$ and a chamber $2^n$ for the reception of the gear 3. This housing may be made in separate halves with lugs $2^c$ on their meeting edges united by bolts $2^o$ as shown in the drawings. As shown the housing has a bearing 6 for the hub of the gear 3 which housing is supported in the inner end of an adjustable nut 8 which supports the lower end of the steering rod casing $4^c$. Preferably a ball thrust bearing 7 is interposed between the outer side of the disk 3 and inner end of bearing 6 and nut 8 to take up the end thrust exerted by this gear on the shaft 4 under the interaction of the spiral ribs $3^a$ on disk 3 and the teeth of gear $1^b$.

The disk 3 can be maintained firmly in engagement with gear $1^b$ by properly turning the nut 8, the pressure on disk 3 being transmitted to the thrust bearing 7; and by this means wear on the gear teeth and ribs can be compensated for.

Referring to Fig. 1 it will be seen that when the steering shaft 4 is turned the disk 3 will be turned therewith and, according to the direction of rotation of the steering shaft 4, the teeth or ribs $3^a$ on disk 3 engaging the spiral gear $1^b$ will cause the latter, and the rocker shaft, to move right or left with greater or less speed according to the angularity of the spiral gears or ribs $3^a$ on the disk 3 and the angularity of the teeth of gear $1^b$; and thus rotation of the shaft 4 will cause a corresponding rotative movement of the rocker shaft 1; and the change of motion is effected immediately and directly by the engagement of the spiral ribs $3^a$ on disk 3 with the spiral teeth of gear $1^b$ on the rocker shaft.

The spiral ribs $3^a$ and the teeth of the spiral gear $1^b$ may be of any desired angularity, but are such that a rotary motion of the steering shaft 4 will impart a rocking movement to the shaft 1. Of course the relative extent of movement imparted by shaft 4 to the shaft 1 through the gearing described will depend upon the relative angularity of the gear ribs and teeth, and could be varied by changing such angularity. The ribs $3^a$ and the teeth on the work gear 1$^b$ are preferably of such angular pitch that they will practically prevent reversibility between shafts 1 and 4; so that while the steering shaft 4 may be turned to impart positive rotary movement to the rocker shaft 1, the rocker shaft 1 will not, under ordinary service pressures, impart a backward rotation to the steering shaft 4. In other words the steering shaft 4 through disk 3 and gear 1$^b$ may operate shaft 1; but shaft 1 can not through said gears operate shaft 4, if the teeth are properly developed, except possibly under very extreme pressure.

I claim:

1. In a steering gear, a casing, a rocker shaft journaled therein, a spiral gear on one end of the rocker shaft, a disk mounted in the casing at right angles to the axis of the rocker shaft and having spiral ribs on its face meshing with the said gear, and a steering shaft entering the casing and connected with said disk; with an adjustable bearing in the casing supporting the said disk and inner end of the steering shaft, a thrust bearing interposed between the disk and said journal bearing, and means for adjusting the thrust bearing to maintain close engagement between the disk and gear.

2. In a steering gear as set forth in claim 1, said adjustable bearing comprising a threaded collar engaging threads in the casing halves, said collar receiving the lower end of the steering post and a bushing on the hub of the disk, whereby when the threaded collar is turned, the pressure on the disk is transmitted to the thrust bearing, thereby compensating for the wear on the gear teeth, substantially as described.

3. In a steering gear; a casing; a rocker shaft journaled therein; a spiral gear on one end of the rocker shaft; a disk mounted in the casing at right angles to the axis of the rocker shaft and having spiral ribs on its face meshing with the said gear; a steering shaft entering the casing and connected with said disk; a threaded adjustable collar in the casing receiving the lower end of said steering shaft and a bushing on the hub of the disk; a thrust bearing interposed between the disk and collar; and means for adjusting the collar to maintain close engagement between the disk and gear to compensate for wear on the gear teeth.

In testimony that I claim the foregoing as my own, I affix my signature.

DAVID E. ROSS.